(12) United States Patent
Zimler

(10) Patent No.: US 7,783,400 B1
(45) Date of Patent: Aug. 24, 2010

(54) SMART CAR ICE AND SNOW ELIMINATOR

(76) Inventor: Peter W Zimler, 10 North St., Glen Cove, NY (US) 11542

(*) Notice: Subject to any disclaimer, the term of this patent is extended or adjusted under 35 U.S.C. 154(b) by 1204 days.

(21) Appl. No.: 11/317,688

(22) Filed: Dec. 23, 2005

(51) Int. Cl.
  *G06F 7/00* (2006.01)
(52) U.S. Cl. .............. 701/36; 701/1; 219/202; 219/203; 244/134 R; 340/425.5
(58) Field of Classification Search .......... 701/1, 701/36; 219/202, 203; 340/425.5; 702/130, 702/170, 171, 172; 244/134 R; 73/170.26
See application file for complete search history.

(56) References Cited

U.S. PATENT DOCUMENTS

| | | | |
|---|---|---|---|
| 2,717,957 A | 9/1955 | Ohlheiser | |
| 3,517,900 A * | 6/1970 | Roussel | 340/962 |
| 4,728,775 A | 3/1988 | Van Straten | |
| 4,904,844 A * | 2/1990 | Chamberlin | 219/203 |
| 5,029,662 A | 7/1991 | Pena | |
| 5,115,116 A | 5/1992 | Reed | |
| 5,140,719 A * | 8/1992 | Cowan | 15/313 |
| 5,386,098 A * | 1/1995 | Knudsen | 219/203 |
| 5,408,071 A | 4/1995 | Ragland | |
| 5,572,881 A * | 11/1996 | Hotta et al. | 62/278 |
| 5,591,365 A | 1/1997 | Shields | |
| 5,763,858 A * | 6/1998 | Jones | 219/506 |
| 5,791,407 A * | 8/1998 | Hammons | 165/202 |
| 6,100,500 A | 8/2000 | Jefferson, Jr. | |
| 6,163,013 A | 12/2000 | King et al. | |
| 6,710,302 B1 | 3/2004 | Rennick | |
| 6,917,693 B1 * | 7/2005 | Kiridena et al. | 382/104 |
| 6,963,049 B1 * | 11/2005 | Martin et al. | 219/202 |
| 7,024,876 B1 * | 4/2006 | Kishek | 62/236 |
| 7,258,092 B2 * | 8/2007 | Beaucaire et al. | 123/142.5 E |
| 7,345,445 B2 * | 3/2008 | Huntzicker | 318/444 |
| 7,441,414 B2 * | 10/2008 | Ziehr et al. | 62/244 |
| 2002/0105432 A1 * | 8/2002 | Pederson et al. | 340/815.45 |
| 2003/0024256 A1 * | 2/2003 | Hanson | 62/208 |
| 2003/0163225 A1 * | 8/2003 | Hanson | 700/299 |

(Continued)

FOREIGN PATENT DOCUMENTS

DE  10024765  11/2001

(Continued)

*Primary Examiner*—Khoi Tran
*Assistant Examiner*—Jaime Figueroa
(74) *Attorney, Agent, or Firm*—Michael I Kroll

(57) ABSTRACT

The present invention is an ice and snow elimination system for motor vehicles. The present invention is unique in that its counterintuitive features are activated when the engine is off. The system allows consumers to remotely activate the ice and snow elimination system in Standard Sentry Mode to keep the exterior car surfaces free of ice and snow. Automatic Sentry Mode functions in the same way except that no remote communication device is needed. The Ice Buster feature is used to quickly eliminate a large buildup of ice and snow (for economy cars) or, in mid-priced cars when the driver forgets to activate Standard Sentry Mode. Upon the availability of better conditions such as the onset of warmer weather, the ice and snow elimination system will shut down temporarily to optimize the system. Preferably, the system has three models available, one for luxury vehicles (Automatic Sentry Mode), another for mid-priced vehicles (Standard Sentry Mode), and another for economy vehicles (Ice Buster Feature).

29 Claims, 14 Drawing Sheets

U.S. PATENT DOCUMENTS

| | | | |
|---|---|---|---|
| 2004/0021575 A1* | 2/2004 | Oskorep | 340/601 |
| 2004/0134995 A1* | 7/2004 | Keeler | 237/12 |
| 2005/0231381 A1* | 10/2005 | Pederson et al. | 340/815.45 |
| 2006/0049922 A1* | 3/2006 | Kolpasky et al. | 340/426.13 |

FOREIGN PATENT DOCUMENTS

| | | |
|---|---|---|
| EP | 0.558.945 | 9/1993 |
| ES | 2.072.216 | 7/1995 |

* cited by examiner

SMART CAR ICE AND SNOW ELIMINATOR

BACKGROUND OF THE INVENTION

Field of the Present Invention

The present invention is an ice and snow elimination system for motor vehicles. In particular, the present invention uses a temperature sensor, precipitation sensor and heating system (that uses heat produced from infrared rays to warm the exterior vehicle surfaces) to melt snow thereby preventing it from accumulating on the exterior vehicle surfaces.

Windshields, windows, and mirrors are the essence of visibility on all motor vehicles. Without good visibility accidents are imminent. Many weather related elements such as dirt, fog, snow, and ice cause poor visibility. The prior art uses heaters, defrosters, and windshield wipers to eliminate an extremely small accumulation of frozen precipitation while the car is being driven. This provides adequate visibility to the driver and passengers. The most important point to emphasize is that heaters and defrosters would take an extremely long time to work if the accumulation has occurred overnight or when you are away from your vehicle for extended periods. It may take up to an hour to eliminate this buildup by way of manual labor.

The following example pertains to people who live in cold climates, such as Europe, Canada and parts of the United States. It clearly illustrates the shortcoming of the prior art.

Is this you? It's 6:00 AM. You hear on the radio that there is going to be a snowstorm today. You park your car at the railroad station and make your commute into the city to your job. Returning home, you get off the train and walk towards your car only to find it completely covered with snow. You open the trunk to get your scraper and broom and proceed to knock off all the snow on your hood, trunk, roof, windshield, windows and rear window. After fifteen minutes you have discovered that under all that snow is a layer of ice covering all the glass surfaces. It takes half an hour to scrape off all the ice. Finally, you get into your car to go home. But wait, you can't go home because the outside mirrors are covered with a layer of ice too. You get out of the car and carefully and delicately scrape off the ice. You get into the car, re-angle the mirrors, and go home. Total time wasted: 45 minutes or longer.

All of the above would not be necessary with the "Smart Car Ice and Snow Eliminator." In the morning, before going to work, simply press the snowflake icon on your car remote when the engine is off. When the precipitation sensor senses snowfall (perhaps several hours later), the heating system automatically goes on and snow is melted and prevented from accumulating on the exterior vehicle surfaces.

The present invention has several advantages over the prior art. It is a time saving and labor saving device and it avoids having to expose oneself to extreme cold. The present invention is unique and counterintuitive because one would not ordinarily think that its features would be activated when the engine is off and the vehicle is unoccupied.

DESCRIPTION OF THE PRESENT INVENTION

The present invention is an ice and snow elimination system for motor vehicles, hereinafter referred to as "Smart Car Ice and Snow Eliminator." Snow and ice are melted by infrared rays, which are emitted by gas tubes or infrared radiant ceramic or quartz heating emitters or any device or process that emits infrared rays. The gas tubes are positioned on the periphery of the exterior vehicle surfaces. The heat from the infrared rays melts snow preventing it from accumulating on the glass and metal surfaces of a motor vehicle. The "Smart Car Ice and Snow Eliminator" allows consumers to remotely activate its features to keep the exterior vehicle surfaces free of snow and ice. The personal communication device may be a computer, a cellular phone, a car remote and/or a personal digital assistant. Upon pressing the snowflake icon on the car remote when the engine is off and the temperature sensor senses that the outside temperature is below a predetermined temperature value of 33° F., a white activation light on the dashboard blinks on and off indicating that the car is now in "Standard Sentry Mode." When frozen precipitation (snow) is sensed by the precipitation sensor, the heating system is turned on and snow is melted and prevented from accumulating on the exterior vehicle surfaces. The "Smart Car Ice and Snow Eliminator" also uses a precipitation sensor for sensing when snowfall begins and ends. The precipitation sensor, upon sensing that snowfall has stopped for a set interval, selectively activates an Evaporation Mode. Infrared rays are produced at a high temperature and evaporate all the water from the glass and metal surfaces. When all the surfaces are completely dry, Standard Sentry Mode is reactivated and, if snowfall resumes, the heating system automatically goes on and snow is melted and prevented from accumulating on the exterior vehicle surfaces. "Automatic Sentry Mode" (for luxury vehicles) functions in the same way except that no remote communication device is needed. An "Ice Buster Feature" is used to quickly eliminate a large buildup of ice and snow (for economy cars) or, in mid-priced cars, when the driver forgets to activate the anticipatory technology (Standard Sentry Mode). Temperature Monitor Mode is activated when the engine is off, the driver presses the snowflake icon on a remote communication device and the temperature sensor senses that the outside temperature is above a predetermined temperature value of 32° F. A green activation light on the dashboard blinks on and off indicating that the car is now in Temperature Monitor Mode. The temperature sensor monitors the outside temperature. When the temperature sensor senses that the outside temperature falls below a predetermined temperature value of 33° F., Standard Sentry Mode is activated. Temperature Monitor Mode is also functional with Automatic Sentry Mode. Please note, however, that no remote communication device is needed with Automatic Sentry Mode.

The "Smart Car Ice and Snow Eliminator" is not limited to vehicle use but can also be used to prevent the accumulation of snow and ice on a myriad of surfaces including, but not limited to, a driveway or walkway.

The following example is illustrative and gives one an understanding of how the invention works:

One hears on the radio that there is going to be a snowstorm today. In the morning you park your car at the railroad station to make your daily commute into the city to your job. Upon leaving your vehicle, you simply press the snowflake icon on your car remote (the engine is off and the outside temperature is below 33° F.). A white activation light on your dashboard blinks on and off indicating that the car is now in "Standard Sentry Mode." When the precipitation sensor indicates that snow is falling, a signal is sent to your power supply (lithium ion battery). Electric current is sent to the gas tubes surrounding all glass surfaces including the hood, trunk and roof. Molecules in the gas tubes are activated and produce infrared rays keeping all surfaces bathed in warmth. This would prevent any accumulation of ice and snow on said surfaces. The process described hereinabove uses precipitation detection technology. Precipitation detection technology (hereinafter referred to as "anticipatory technology") exists on luxury cars today. (Rain-sensing wipers that "know" when it starts to rain are automatically activated upon sensing rainfall). Activated by pressing the snowflake icon on your car remote (say at 6:00 AM), infrared rays are not produced until the snowfall begins (say at 10:00 AM). If, in the above example, one forgot to place the car in "Standard Sentry Mode," (by forgetting to press the snowflake icon on your car remote), then one could still make use of infrared capabilities to eliminate a large buildup of ice and snow in a short eg. 10 minute period. This process is hereinafter referred to as the "Ice Buster Feature." The "Ice Buster Feature" is activated by pressing the ice buster icon on your car remote. Please note that "Standard Sentry Mode" and its backup "Ice Buster Feature" would be marketed on mid-priced vehicles (such as Honda, Nissan, Toyota, Chevrolet, etc.). Also note that if "Standard Sentry Mode" (with its sophisticated anticipatory technology) cannot be successfully marketed on economy cars (such as Kia, Hyundai, Saturn, etc.), then just the "Ice Buster Feature" would be present on the economy cars. If, on the other hand, the developmental cost of anticipatory and ice-buster technologies together are not significantly higher than ice buster technology alone, then both features would be present on the economy cars.

Complete List of Features of Standard Sentry Mode: (Also Includes Temperature Monitor Mode)

1) Gradual Warm Up Feature:

Infrared rays start at low temperature and gradually get hotter so that glass does not crack.

2) Power Saver Feature:

The gas tubes continually turn on and off so that the glass does not get too hot.

3) Activation Light Feature:

When the vehicle is put in Standard Sentry Mode, a white light on the dashboard blinks on and off.

4) Automatic Shutoff Feature:

Standard Sentry Mode turns off after seventy-two (72) hours or when the engine is started.

5) Variable Temperature Feature:

The temperature of the infrared rays varies depending on the outside temperature. The heat produced by the infrared rays would get hotter as the outside temperature decreases.

6) Evaporation Mode Feature:

When the precipitation sensor indicates that snowfall has stopped for a set interval, the evaporation mode begins. Infrared rays are produced at a high temperature and evaporate all the water from the glass and metal surfaces. This prevents the formation of ice. When all the surfaces are completely dry, "Standard Sentry Mode" is reactivated, and, if snowfall resumes, the heating system automatically goes on and snow is melted and prevented from accumulating on the exterior vehicle surfaces.

Another example of when the evaporation mode is functional is during the Ice Buster Mode. After all the ice and snow is melted the Evaporation Mode evaporates accumulated water on all glass and metal surfaces. This prevents the formation of ice.

Still another example of when the evaporation mode is functional is just prior to system shutoff (after 72 hours). All water is evaporated from all glass and metal surfaces to prevent ice from forming after system shutoff.

7) Oversight Feature:

"Standard Sentry Mode" includes an oversight feature, hereinafter referred to as the "Ice Buster Feature." The "Ice Buster Feature" uses infrared capabilities to quickly eliminate buildups of ice and snow in the event the anticipatory technology was not activated. (The user forgot to press the snowflake icon on the car remote). The "Ice Buster Feature" turns off automatically when the engine is started. The "Ice Buster Feature" turns off automatically when all the ice and snow is melted.

8) Operational Feature:
a) Standard Sentry Mode is deactivated when the engine is started.
b) If the temperature sensor senses that the exterior temperature rises above 32° F., Standard Sentry Mode shuts off and enters Standby Mode. Standard Sentry Mode returns when the temperature sensor indicates that the outside temperature falls below a predetermined temperature value of 33° F.

Temperature Monitor Mode

Temperature monitor mode is activated when the engine is off, the driver presses the snowflake icon on a remote communication device and the temperature sensor senses that the exterior temperature is above a predetermined temperature value of 32° F.

More specifically, Temperature Monitor Mode is operational as described below:
  a) With the engine off, the driver presses the snowflake icon on a remote communication device and the temperature sensor senses that the outside temperature is within a temperature range of 33° F. and 38° F. The temperature sensor continuously monitors the outside temperature. When the temperature sensor senses that the outside temperature falls below a predetermined temperature value of 33° F., Standard Sentry Mode shall be activated.
  b) Additionally, Temperature Monitor Mode shall be activated when the engine is off, the driver presses the snowflake icon on a remote communication device, and the temperature sensor senses that the outside temperature is within a temperature range of 39° F. to 44° F. The temperature sensor monitors the outside temperature at set intervals (say every 15 or 20 minutes). When the temperature sensor senses that the outside temperature falls below a predetermined temperature value of 33° F., Standard Sentry Mode shall be activated.
  c) Temperature Monitor Mode is also functional with Automatic Sentry Mode. Please note, however, that no remote communication device is needed with Automatic Sentry Mode.
  d) Temperature Monitor Mode is not operational when the engine is off, the driver presses the snowflake icon on a remote communication device and the temperature sensor senses the outside temperature is above a predetermined temperature value of 44° F. or another temperature value to be determined by a manufacturer at the research and development stage.
  e) Temperature Monitor Mode is deactivated when the engine is started.

Description of "Automatic Sentry Mode"

To make the invention more appealing and "user friendly" to luxury car buyers, a second sentry mode hereinafter referred to as "Automatic Sentry Mode" shall be described. The initial application had the driver press the snowflake icon on the car remote in anticipation of a snowstorm. This placed the car in "Standard Sentry Mode". The new application would make it unnecessary for the driver to use the car remote. "Automatic Sentry Mode" is activated when the following criteria are met:

1) The engine is off; and 2) the temperature sensor indicates that the exterior temperature is below 33° F.

Please note that there is no "Ice Buster Feature" in "Automatic Sentry Mode." As long as the temperature is below 33° F. and the engine is off, the vehicle would always be in "Automatic Sentry Mode", and, if there is snowfall, the heating system would automatically go on and snow would be melted and prevented from accumulating on the exterior vehicle surfaces. Please note that "Automatic Sentry Mode" is deactivated when the engine is started.

DESCRIPTION OF THE PRIOR ART

Numerous other snow removal systems exist in the prior art. Typical of these are U.S. Pat. Nos. 2,717,957; 4,728,775; 5,029,662; 5,115,116; 5,408,071; 5,591,365; 6,100,500; 6,163,013; 6,710,302; and International Patent Applications EP 0 558 845; ES 2072216 and DE 10024765. While these ice and snow removal systems may be suitable for the purposes for which they were designed, they would not be as suitable for the purposes of the present invention, as hereinafter described.

U.S. Pat. No. 2,717,957

Inventor: Carlton E. Ohlheiser

Issued: Sep. 13, 1955

This invention relates to snow, ice and sleet sensing devices, and more particularly to an apparatus for detecting the presence of snow, ice or sleet on an exposed structure, such as an antenna, and for controlling a heater or similar device provided to remove the accumulated snow, ice or sleet from said structure.

U.S. Pat. No. 4,728,775

Inventor: George A. Van Straten

Issued: Mar. 1, 1988

An indicator light for vehicles and the like including a heated lens or cover. The heated cover is operatively connected to the indicator light, and is comprised of a thermally conducive, translucent cover plate. The cover plate has interior and exterior surfaces to which an elongated resistor is operatively connected in a widespread pattern to heat at least a major portion of the exterior surface of the cover. The resistor is electrically connected to the electrical system of the vehicle to induce an electric current through the cover, such that frozen particulate on the exterior surface thereof is melted for improved visibility through the indicator light and related vehicle safety.

U.S. Pat. No. 5,029,662

Inventor: Henry A. Pena

Issued: Jul. 9, 1991

A remote starting apparatus utilizes a receiver for receiving a command signal from a remote transmitter operated by a user. The apparatus facilitates both the starting of the vehicle from a remote location as well as the supplying of extra fuel to the vehicle's carburetor as required. The receiver is positioned on the dashboard of the vehicle and a flexible heating pad may be employed to keep the window free and clear of accumulated condensation so that the receiver can receive the command signal generated by the remotely located transmitter.

U.S. Pat. No. 5,115,116

Inventor: Mark E. Reed

Issued: May 19, 1992

A vehicle preheating system which provides for the preheating of the vehicle interior, as well as other components, is disclosed. The system includes an electrical heating element installed within the heater assembly of the vehicle and is supplied with electrical power by an external source. The standard vehicle heater fan is supplied with electrical power from a transformer and rectifier in the circuit, thus using only external power rather than vehicle battery power. The system is controlled by a time controller, which may be preset to activate the heater assembly at some predetermined time prior to vehicle operation, and may provide for other component preheating devices such as engine and battery warmers. The time controller may activate each of these devices simultaneously, or independently at various times depending upon the lead time required to thoroughly warm each component. Alternatively, power may be applied to each device in turn in order to avoid excessive current draw from the external circuit. The time controller may also contain additional circuitry interconnected with the vehicle ignition system which provides a visual and/or aural warning when the ignition system is activated and the system is still plugged in and receiving power from the external source. Alternatively, the time controller may be set to deactivate the vehicle starter system when the time controller is receiving external power. The external power cord is contained on a reel which is installed within the vehicle body and is retracted onto the reel for storage when not in use.

U.S. Pat. No. 5,408,071

Inventor: G. William Ragland

Issued: Apr. 18, 1995

A heat distributing device which includes a concentrated heat source and a stack of metal foils wherein the heat source is encapsulated between two of the layers of metal foil. The heat source can be a resistance heated wire which extends linearly and has a free end spaced inwardly from an end of the stack. The outer edge of the stack can be open or sealed. The stack can include metal wool and/or insulating material between layers of the metal foil. The heat distributing device can be used to provide uniform heating across an outermost layer of the metal foil. For instance, the heat distributing device can be used to heat a side-view mirror of an automobile.

U.S. Pat. No. 5,591,365

Inventor: Christopher G. Shields

Issued: Jan. 7, 1997

A heating apparatus for preventing the accumulation of snow and ice, and having an apertured heating mat in the form of a lattice or web. The heating mat is made of a durable weatherproof insulative polymer so that the mat may be installed on any outdoor surface, such as a driveway, walkway or rooftop. The apertures within the lattice serve to increase the flexibility of the mat, thus allowing the mat to fit uneven surfaces. In addition, this flexibility allows the mat to be easily rolled up when not in use, the apparatus therefore only occupying minimal storage space. The heating mat is also constructed to be highly resistant to wear and may be left outdoors for the entire snow season, exposed to both the elements and frequent vehicular traffic without losing its effectiveness. Also included is a controller from which the apparatus can be set to a manual mode, in which the apparatus may be manually activated, or an automatic mode, in which the apparatus is automatically activated by snowfall.

U.S. Pat. No. 6,100,500

Inventor: Bobby J. Jefferson, Jr.

Issued: Aug. 8, 2000

A vehicle glass clearing system includes an installed portion and an auxiliary heating system including an auxiliary heating element having a control and drive circuit having mechanisms for detecting the moisture level and the temperature and that provides a higher drive current to the heating element when threshold temperature and moisture levels are detected.

U.S. Pat. No. 6,163,013

Inventor: James H. King, et al

Issued: Dec. 19, 2000

An electric heating grid extends from the middle of one side of the windshield, down that side to the bottom of the windshield, and from there across the bottom to the opposite side. The grid is operated by a control circuit having an on-off switch that is accessible to the vehicle operator. The control circuit includes a switch for sensing ambient outdoor temperature so as to allow the grid to be operated only when the outdoor temperature is below a threshold that distinguishes wintertime from non-wintertime conditions.

U.S. Pat. No. 6,710,302

Inventor: Mark Rennick

Issued: Mar. 23, 2004

A sensor assembly includes an integral heating unit. The sensor assembly includes a sensor housing which can be attached to an exterior surface of a vehicle. A transducer is configured to receive interrogation signals from a controller and to transmit signals in response to the interrogation signals. A heating unit is positioned in the sensor housing. The heating unit includes a shell including a recess which is sized and configured to receive the transducer. A heating coil formed of a high resistance wire is embedded in the shell. The heating coil is configured to radiate heat to warm the transducer to melt built up ice and snow which can block signals emitted by the transducer.

European Patent Number: 0 558 845

Inventor: Watanabe, Koji et al

Issued: Sep. 8, 1993

The present invention provides a heating unit wherein a surface heating element (4), in which an electrically conducive coating is applied onto a cloth, is positioned between metal plates (2) such as aluminum plates above and below and wrapped in a tar-based moisture-proof sheet (3). The heating unit is then embedded beneath the surface of a road paving or other surface. The heating unit is preferably supported by a steam rolled asphalt and concrete base layer which has been coated with a primer. After installing and wiring the above-mentioned heating unit (4) on top of said primer-coated base layer, an additional coating of primer is applied followed by paving with a material having a high degree of thermal conductivity, such as an asphalt layer or concrete containing fine granules of blast furnace slag, to function as the surface material.

Spanish Patent Number: ES 2072216

Inventor: Arno Fernandez Alfredo

Issued: Jul. 1, 1995

Infrared rays for reducing freezing on roads and the like. The system includes a series of heating equipment 10, using infrared rays, provided in order to be located in series at the edge of a road 11, dual carriageway or similar surface, in order to heat up the latter, preventing the formation of ice or in order to cause thawing or melting of snow, the equipment preferably being supplied by means of a liquefied petroleum gas via corresponding pipes 12 which are supplied from a general tank 13, this infrared equipment being mounted on posts suitably located at regular intervals along the roadway, specifically at the edge of the latter, having temperature sensors for starting up and/or shutting down the system when certain temperature values, relating both to the ambient air and to the actual roadway, are reached. The system is supplemented with one or more local control centers or equipment items capable of being combined with remote-control equipment, functioning manually or automatically.

German Patent Application DE 10024765

Inventor: Raulfs Hermann

Filed: Nov. 22, 2001

The wheel (1) is made from cast metal or sheet metal and can be heated directly by an electric heating system to melt ice and snow etc. The electric heating comprises a resistance wire (9) which is electrically insulated from the wheel and has current flowing through. The resistance wire can be cast into the material of the wheel and connected electrically to the mains supply on the vehicle.

SUMMARY OF THE PRESENT INVENTION

The present invention is an ice and snow elimination system for motor vehicles, hereinafter referred to as "Smart Car Ice and Snow Eliminator." Snow and ice are melted by infrared rays which are emitted by gas tubes or infrared radiant ceramic or quartz heating emitters or any device or process that emits infrared rays. The gas tubes are positioned around the periphery of the exterior vehicle surfaces. The heat from the infrared rays melts snow preventing it from accumulating on the glass and metal surfaces of a motor vehicle. The "Smart Car Ice and Snow Eliminator" is activated by pressing the snowflake icon on a remote communication device when the engine is off and the temperature sensor senses that the outside temperature is below a predetermined temperature value of 33° F. A white activation light on the dashboard blinks on and off indicating that the car is now in Standard Sentry Mode. When snow is detected by the precipitation sensor, the heating system is turned on and snow is melted and prevented from accumulating on the exterior vehicle surfaces. The "Smart Car Ice and Snow Eliminator" also uses a precipitation sensor for determining when precipitation begins and ends. The precipitation sensor, upon sensing that snowfall has stopped for a set interval, selectively activates an Evaporation Mode. Infrared rays are produced at a high temperature and evaporate all the water from the glass and metal surfaces. This prevents the formation of ice. When all the glass and metal surfaces are completely dry, Standard Sentry Mode is reactivated, and, if snowfall resumes, the heating system will automatically go on and snow will be melted and prevented from accumulating on the exterior vehicle surfaces. Automatic Sentry Mode (for luxury cars) functions in the same way. Please note, however, that no remote communication device is needed with Automatic Sentry Mode. An Ice Buster Feature is used to quickly eliminate a large buildup of ice and snow (for economy cars) or, in mid-priced cars, when the driver forgets to activate the anticipatory technology (Standard Sentry Mode). Temperature Monitor Mode is activated when the driver presses the snowflake icon on a remote communication device when the engine is off and the temperature sensor senses that the outside temperature is above a predetermined temperature value of 32° F. A green activation light on the dashboard blinks on and off indicating that the car is now in Temperature Monitor Mode. When the temperature sensor senses that the outside temperature falls below a predetermined temperature value of 33° F., Standard Sentry Mode is activated. Temperature Monitor Mode is also functional with Automatic Sentry Mode. Please note, however, that no remote communication device is needed with Automatic Sentry Mode. Temperature Monitor Mode is not operational if the temperature sensor senses that the outside temperature is above a predetermined temperature value of 44° F. Temperature Monitor Mode is deactivated when the engine is started.

The "Smart Car Ice and Snow Eliminator" is not limited to vehicle use but can also be used to prevent the accumulation of snow and ice on a myriad of surfaces including, but not limited to, a driveway or walkway.

OBJECTS OF THE PRESENT INVENTION

A primary object of the present invention is to provide an ice and snow elimination system that overcomes the shortcomings of the prior art.

Another object of the present invention is to save the user the burden of manual labor by providing an ice and snow elimination system.

Still another object of the present invention is to provide an ice and snow elimination system including gas tubes positioned on the periphery of the exterior vehicle surfaces for emitting infrared rays to warm the surfaces.

Still another object of the present invention is to provide an ice and snow elimination system wherein the exterior surface of the vehicle is at least one of a hood, roof, trunk, front windshield, rear windshield, passenger side windows, driver side windows and outside mirrors.

Yet another object of the present invention is to provide an ice and snow elimination system wherein a personal communication device provides the user with a wireless interface to start the system.

Yet another object of the present invention is to provide an ice and snow elimination system wherein the personal communication device is at least one of a computer, a cellular phone, a car remote and/or a personal digital assistant.

An even further object of the present invention is to provide an ice and snow elimination system including a first and second sentry mode of operation hereinafter referred to as Standard Sentry Mode and Automatic Sentry Mode respectively.

Still a further object of the present invention is to provide an ice and snow elimination system wherein Standard Sentry Mode and Automatic Sentry Mode include a temperature sensor for sensing the outside temperature.

Still yet another object of the present invention is to provide an ice and snow elimination system including a precipitation sensor for determining when precipitation begins and ends.

An even further object of the present invention is to provide an ice and snow elimination system wherein when the temperature sensor senses that the outside temperature is below a predetermined temperature value of 33° F. and the precipitation sensor detects snowfall and the engine is off, the heating system will be activated and infrared rays will melt any snow that falls on the exterior surfaces of the vehicle preventing any accumulation of snow and ice on said surfaces.

Still another object of the present invention is to provide an ice and snow elimination system wherein in a first sentry mode (Standard Sentry Mode) the precipitation sensor, upon determining that snowfall has stopped for a set interval, selectively activates an evaporation mode to evaporate accumulated water from the glass and metal surfaces.

Yet another object of the present invention is to provide an ice and snow elimination system wherein an Ice Buster button on a remote communication device provides a manual activation of the heating system to melt a heavy accumulation of ice and snow when Standard Sentry Mode was not activated.

Still a further object of the present invention is to provide an ice and snow elimination system wherein an Ice Buster feature heats up the glass and metal surfaces instantly to remove ice and snow after it has settled on the glass and metal surfaces of a motor vehicle.

An even further object of the present invention is to provide an ice and snow elimination system wherein after the ice buster mode melts all the snow and ice from the glass and metal surfaces, the evaporation mode evaporates accumulated water from all the glass and metal surfaces.

Still another object of the present invention is to provide an ice and snow elimination system wherein when the driver presses the ice buster button on a remote communication device and the temperature sensor senses that the outside temperature is above a predetermined temperature value of 44° F., the ice buster mode is not operational.

Another object of the present invention is to provide an ice and snow elimination system wherein in a second sentry mode, Automatic Sentry Mode, the temperature sensor causes the system to be inactivated if an outside temperature value is greater than or equal to the predetermined temperature value of 33° F.

Yet another object of the present invention is to provide an ice and snow elimination system wherein in a second sentry mode, Automatic Sentry Mode, when the temperature sensor indicates that the exterior temperature returns below 33° F., the Automatic Sentry Mode shall be reactivated.

Still yet another object of the present invention is to provide an ice and snow elimination system wherein a first sentry mode, Standard Sentry Mode, includes an automatic shutoff feature after 72 hours.

Another object of the present invention is to provide an ice and snow elimination system having a power source incorporating all future means of power generation, such as proton exchange membrane fuel cell. The invention is not limited to any one type of power source and the use of lithium ion batteries is one possible means of providing a power source. Therefore, the type of power source used is a design decision that forms no part of the present invention.

Yet another object of the present invention is to provide various gas tube configurations including placement across the top and/or bottom of the front and rear windshields.

Still another object of the present invention is to provide for infrared wave generation having a degree of incidence with the glass and metal surfaces calculated to prevent adverse effects to the glass and/or metal surfaces.

Another object of the present invention is to provide an "Ice and Snow Eliminator" adaptable to static object, such as walkways, driveways and can form an integral part of simulated paving stones that would melt snow before it hits a driveway or walkway.

Still yet another object of the present invention is to provide a system wherein "Automatic Sentry Mode" is activated as long as the engine is off and the outside temperature is below 33° F. and would be deactivated when the engine is started or the outside temperature rises above 32° F. Additionally, "Automatic Sentry Mode" would be deactivated when the driver uses an "automatic garage door opener" to park the car in a garage.

Another object of the present invention is to provide an ice and snow elimination system wherein when the engine is off, the driver presses the snowflake icon on a remote communication device, and the temperature sensor senses that the outside temperature is above a predetermined temperature value of 32° F., Temperature Monitor Mode shall be activated. The temperature sensor shall monitor the outside temperature continuously (at outside temperature values between 33° F. and 38° F.) or at set intervals (at outside temperature values between 39° F. and 44° F.). When the temperature sensor senses that the outside temperature falls below a predetermined temperature value of 33° F., Standard Sentry Mode shall be activated.

An even further object of the present invention is to provide an ice and snow elimination system wherein Temperature Monitor Mode is also functional with Automatic Sentry Mode. Please note, however, that no remote communication device is needed with Automatic Sentry Mode.

Still another object of the present invention is to provide an ice and snow elimination system wherein when the driver presses the snowflake icon on a remote communication device and the temperature sensor senses that the outside temperature is above a predetermined temperature value of 44° F., Temperature Monitor Mode shall not be operational.

Yet another object of the present invention is to provide an ice and snow elimination system wherein Temperature Monitor Mode is deactivated when the engine is started.

An even further object of the present invention is to provide an ice and snow elimination system wherein Standard Sentry Mode is deactivated when the engine is started.

Yet another object of the present invention is to provide an ice and snow elimination system wherein Automatic Sentry Mode is deactivated when the engine is started.

Still another object of the present invention is to provide an ice and snow elimination system wherein in a second sentry mode, Automatic Sentry Mode, the precipitation sensor, upon determining that frozen precipitation has stopped for a set interval, selectively activates an evaporation mode to evaporate accumulated water from the glass and metal surfaces.

An even further object of the present invention is to provide an ice and snow elimination system wherein in a first sentry mode, Standard Sentry Mode, the temperature sensor causes the system to be inactivated if a temperature value is greater than or equal to a predetermined temperature value of 33 degrees Fahrenheit.

Yet another object of the present invention is to provide an ice and snow elimination system wherein in a first sentry mode, Standard Sentry Mode, when the temperature sensor indicates that the exterior temperature returns below 33° F., the Standard Sentry Mode shall be reactivated.

An even further object of the present invention is to provide an ice and snow elimination system wherein after the evaporation mode has evaporated all the water from the glass and metal surfaces, either Standard Sentry Mode or Automatic Sentry Mode is reactivated and, if snowfall resumes, snow will be prevented from accumulating on the exterior vehicle surfaces.

Additional objects of the present invention will appear as the description proceeds.

The present invention overcomes the shortcomings of the prior art by providing an ice and snow elimination system for motor vehicles when the engine is off. The present invention is unique in that its counterintuitive features are activated when the engine is off. The system allows consumers to remotely activate the ice and snow elimination system in Standard Sentry Mode to keep the exterior car surfaces free of ice and snow. Upon the availability of better conditions such as the onset of warmer weather, the ice and snow elimination system will shut down temporarily to optimize the system. Preferably, the system has three models available, one for luxury vehicles (Automatic Sentry Mode), another for mid-priced vehicles (Standard Sentry Mode), and another for economy vehicles (Ice Buster Feature).

The foregoing and other objects and advantages will appear from the description to follow. In the description reference is made to the accompanying drawings which form a part hereof, and in which are shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawings in which.

DESCRIPTION OF THE REFERENCED NUMERALS

Figure 1:
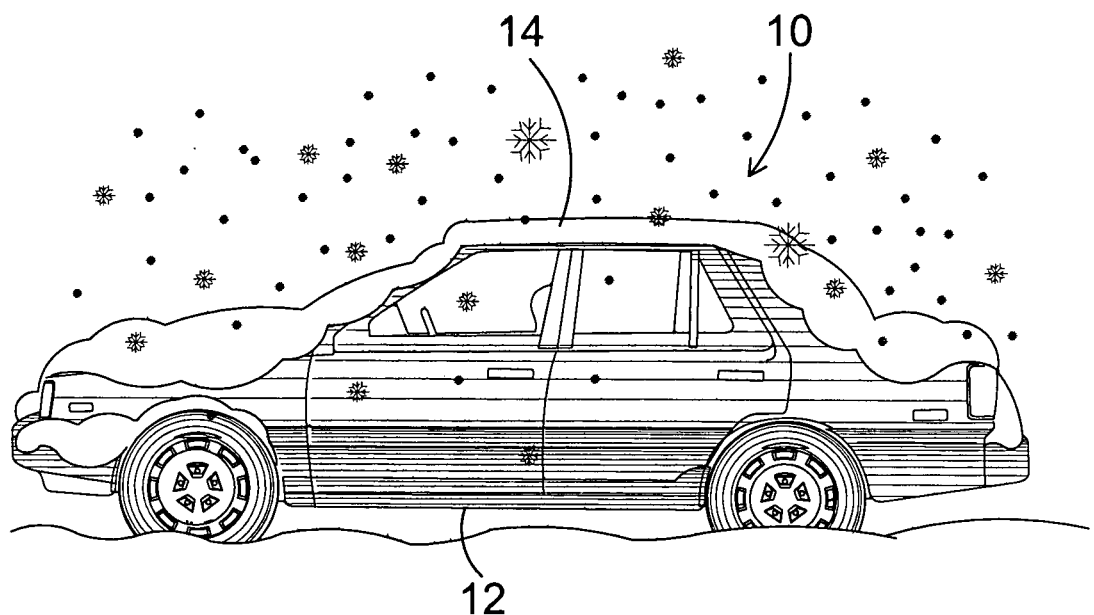
FIG. 1 is a side view of a vehicle after snowfall without the ice and snow elimination system of the present invention.

Turning now descriptively to the drawings, in which similar references characters denote similar elements throughout the several views, the Figures illustrate the ice and snow elimination system of the present invention. With regard to the reference numerals used, the following numbering is used throughout the various drawing Figures.

| 10 | ice and snow elimination system of the prior art without the present invention |
|---|---|
| 12 | vehicle |
| 14 | snow and ice |
| 15 | front windshield |
| 16 | gas tubing around front windshield |
| 18 | precipitation sensor |
| 19 | gas tube for hood |
| 20a | white activation light on dashboard |
| 20b | green activation light on dashboard |
| 21 | roof |
| 22 | gas tubing around roof |
| 23 | driver side window molding |
| 24 | gas tubing around rear windshield |
| 25 | rear windshield |

-continued

| 26 | remote unit |
|---|---|
| 27 | gas tubes hidden underneath driver side window molding |
| 28 | unlock button |
| 30 | lock button |
| 31 | Ice Buster button on remote communication device |
| 32 | Ignition start button |
| 34 | snowflake remote button on block diagram |
| 36 | ice buster remote button on block diagram |
| 38 | battery |
| 40 | processor |
| 42 | temperature sensor |
| 44 | clock |
| 46 | voltage regulator |

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments. Practitioners skilled in the art will recognize numerous other embodiments as well. For definition of the complete scope of the invention, the reader is directed to appended claims.

Referring to FIG. 1, shown is a side view of a vehicle 12 after snowfall 14 without the ice and snow elimination system of the present invention 10.

Figure 2:
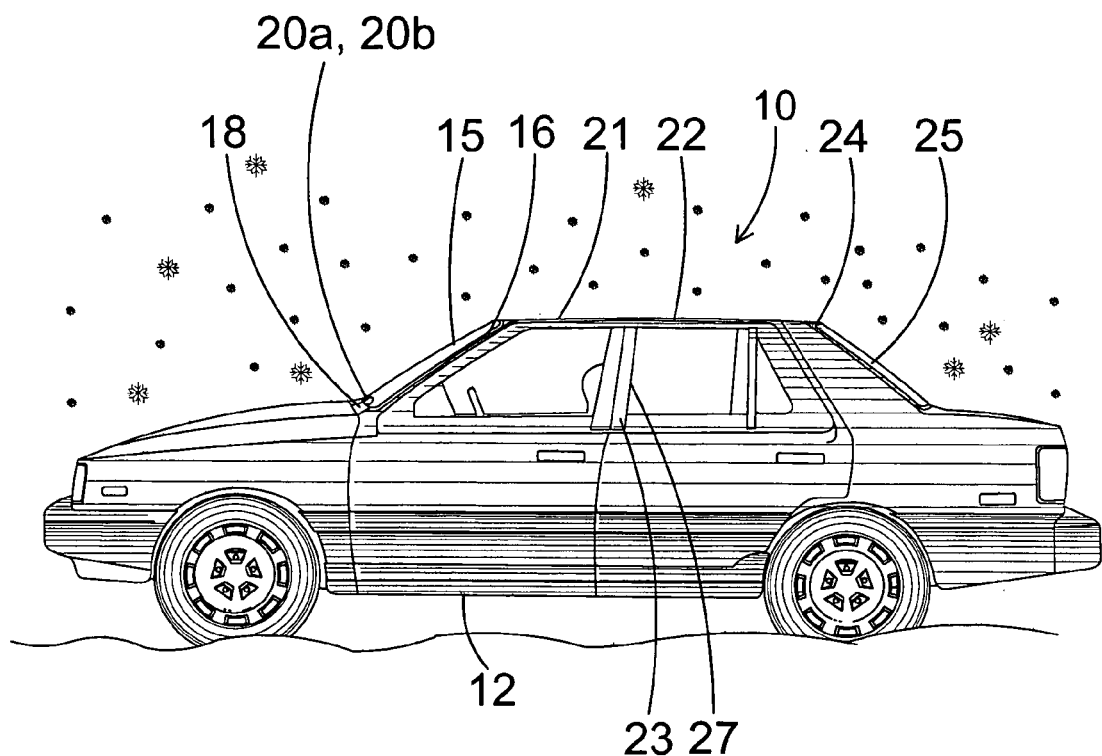
FIG. 2 is a side view of a vehicle including the ice and snow elimination system of the present invention.

Referring to FIG. 2, shown is a side view of a vehicle 12 including the ice and snow elimination system of the present invention 10 including a precipitation sensor 18 activation lights 20a, 20b on the dashboard, gas tubing 16 around the front windshield 15, gas tubing 22 around the roof 21, gas tubing 24 around rear windshield 25 and gas tubes 27 hidden underneath the driver side window molding 23.

Figure 3:
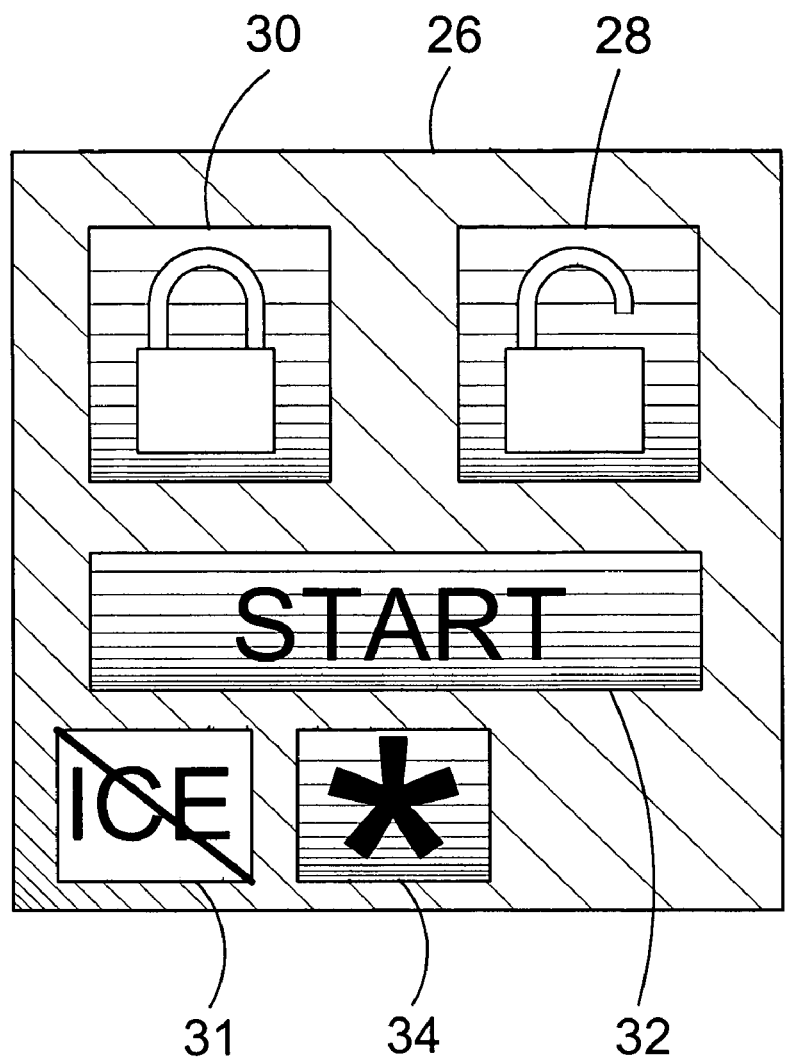
FIG. 3 is a perspective view of a remote communication unit for use with the ice and snow elimination system of the present invention.

Referring to FIG. 3, shown is a perspective view of a remote communication unit 26 for use with the ice and snow elimination system of the present invention showing the lock button 30, the unlock button 28, the ice buster button 31, the snowflake remote button 34 and the ignition start button 32.

Figure 4:
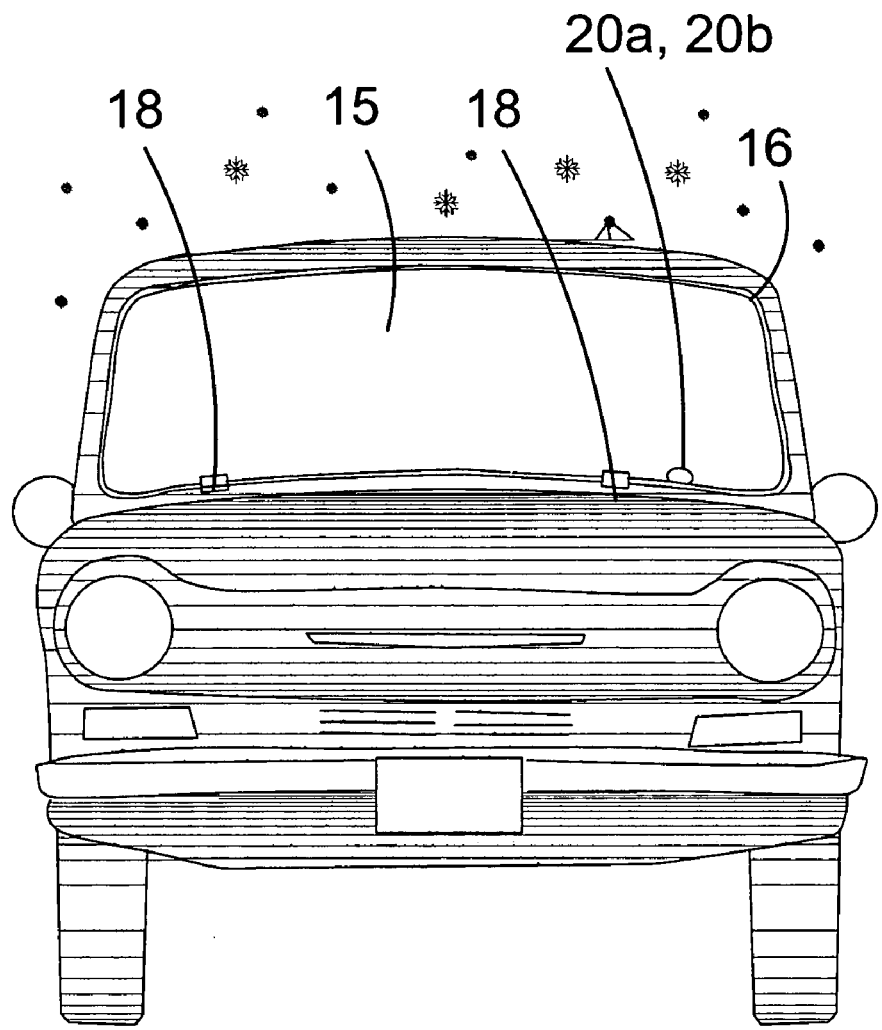
FIG. 4 is a front view of a vehicle including the ice and snow elimination system of the present invention.

Referring to FIG. 4, shown is a front view of a vehicle including the ice and snow elimination system of the present invention showing the gas tubing 16 around the front windshield 15, the precipitation sensor 18 and the activation lights 20a, 20b.

Figure 5:
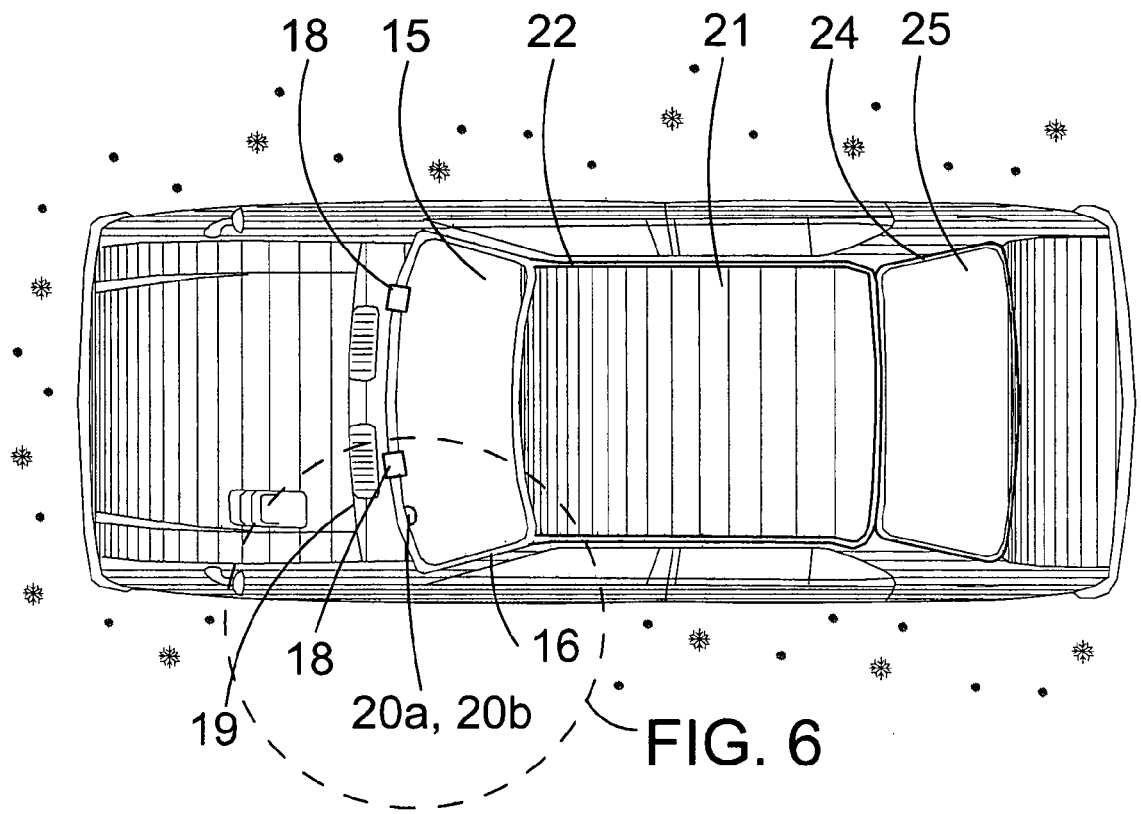
FIG. 5 is a top view of a vehicle including the ice and snow elimination system of the present invention installed.

Referring to FIG. 5, shown is a top view of a vehicle including the ice and snow elimination system of the present invention installed showing the precipitation sensors 18, gas tube 19 for the hood, white activation light 20a and green activation light 20b, gas tubing 16 around front windshield 15, gas tubing 22 around the roof 21 and the gas tubing 24 around the rear windshield 25.

Figure 6:
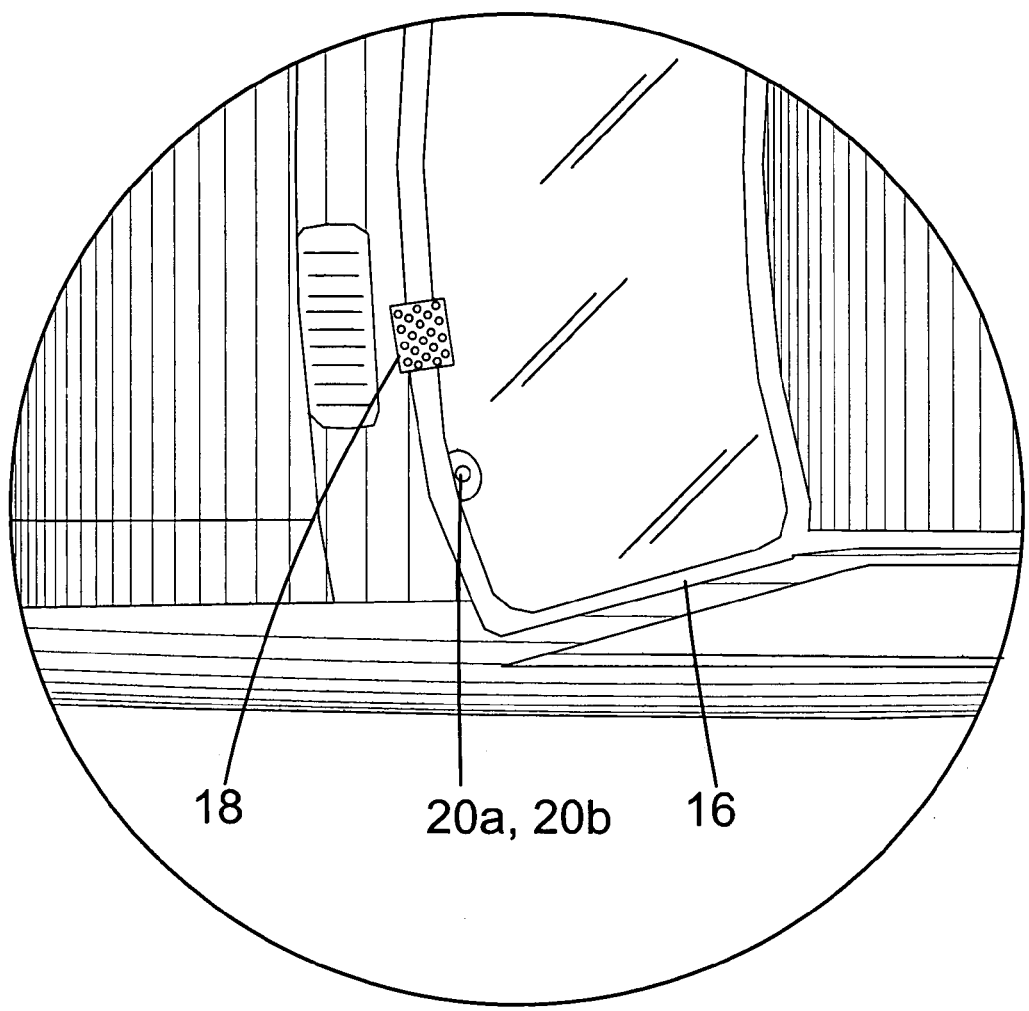
FIG. 6 is an enlarged view of a vehicle windshield including the ice and snow elimination system of the present invention taken from within the circle labeled 6 in FIG. 5.

Referring to FIG. 6, shown is an enlarged view of a vehicle windshield including the ice and snow elimination system of the present invention taken from FIG. 5 as indicated. Shown is a precipitation sensor 18, the white and green activation lights 20a, 20b and the gas tubing 16 around the front windshield.

Figure 7:
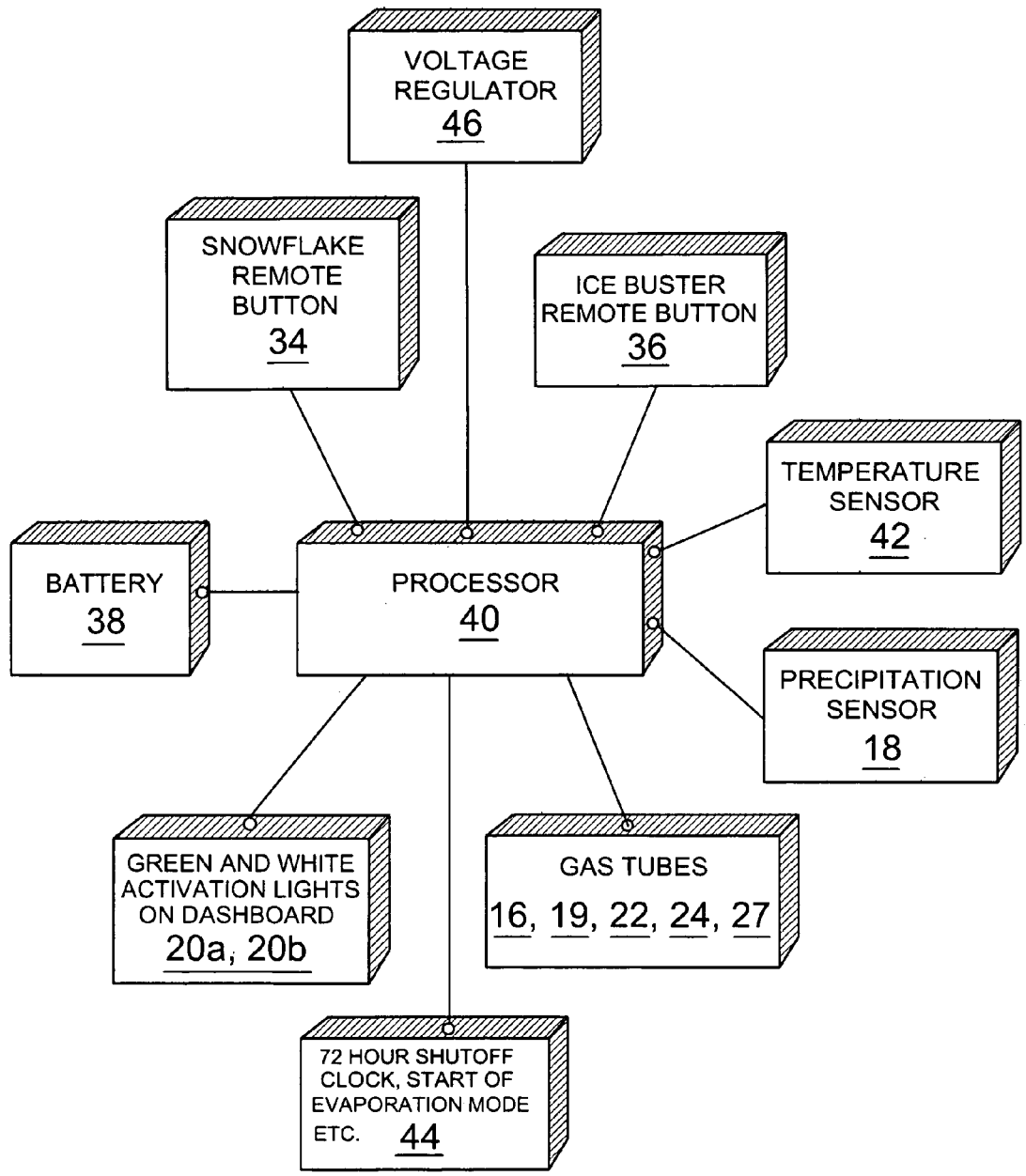
FIG. 7 is a block diagram of the ice and snow elimination system of the present invention.

Referring to FIG. 7, shown is a block diagram of the ice and snow elimination system of the present invention. Shown is the processor 40 in communication with the voltage regulator 46, the ice buster remote button 36, the temperature sensor 42, the precipitation sensor 18, the gas tubes 16,19,22,24,27, the 72 hour shutoff clock 44, the green and white activation lights 20a, 20b, the battery 38 and the snowflake remote button 34.

Figure 8:
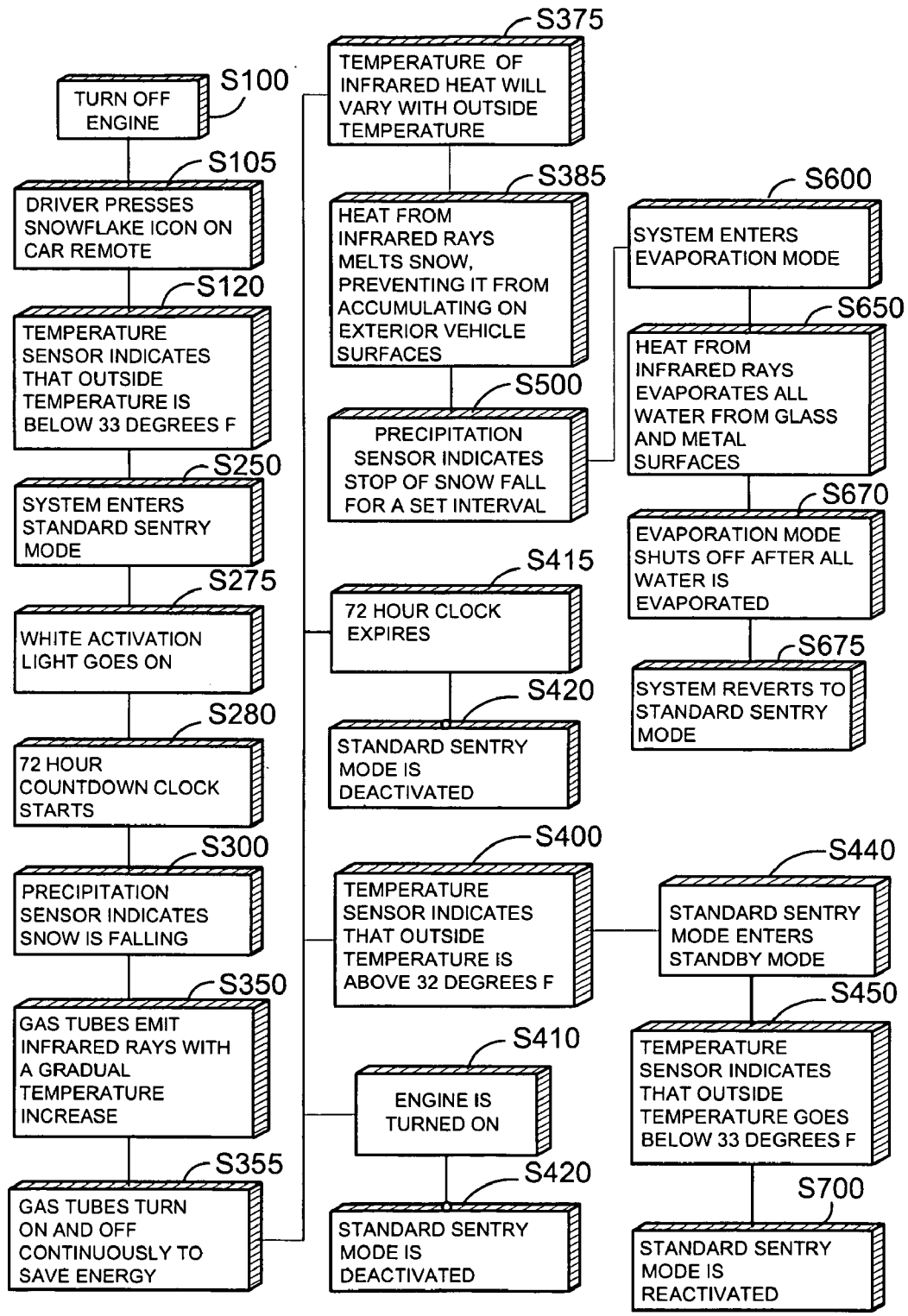
FIG. 8 is a block diagram of the standard sentry mode of the present invention.

Referring to FIG. 8, shown is a block diagram of the standard sentry mode of the present invention. As shown in step S100, the engine is turned off. The driver presses the snowflake icon on the car remote in step S105.

Thereafter, when the temperature sensor indicates that the outside temperature is below 33° F. as stated in step S120, the system enters standard sentry mode in step S250. A white activation light goes on in step S275 and a 72-hour countdown clock starts the operative duration of standard sentry mode, as shown in step S280. Expiration of the 72-hour clock in step S415 deactivates standard sentry mode in step S420. Additionally, starting the engine in step S410 automatically deactivates standard sentry mode in step S420.

In step S300 when the precipitation sensor detects snow falling, gas tubes emit infrared rays with a gradual temperature increase in step S350 that continuously turn on and off to save energy in step S355 with the temperature of the infrared heat varying with outside temperature in step S375. Accordingly, heat from the infrared rays melts the snow, preventing it from accumulating on exterior vehicle surfaces in step S385.

In step S500, the precipitation sensor indicates the stop of snowfall for a set interval. As a consequence, the system enters evaporation mode in step S600. Whereupon, heat from infrared rays evaporates all water from glass and metal surfaces in step S650. Evaporation mode shuts off after all water is evaporated in step S670, with the system reverting to standard sentry mode in step S675.

As aforementioned in step S105, the driver presses the snowflake icon on the car remote energizing the temperature sensor, which if the temperature sensor indicates that outside temperature is above 32° F. in step S400, standard sentry mode enters standby mode in step S440 until in step S450 when the temperature sensor indicates that outside temperature goes below 33° F., thereafter standard sentry mode is reactivated in step S700.

Figure 9:
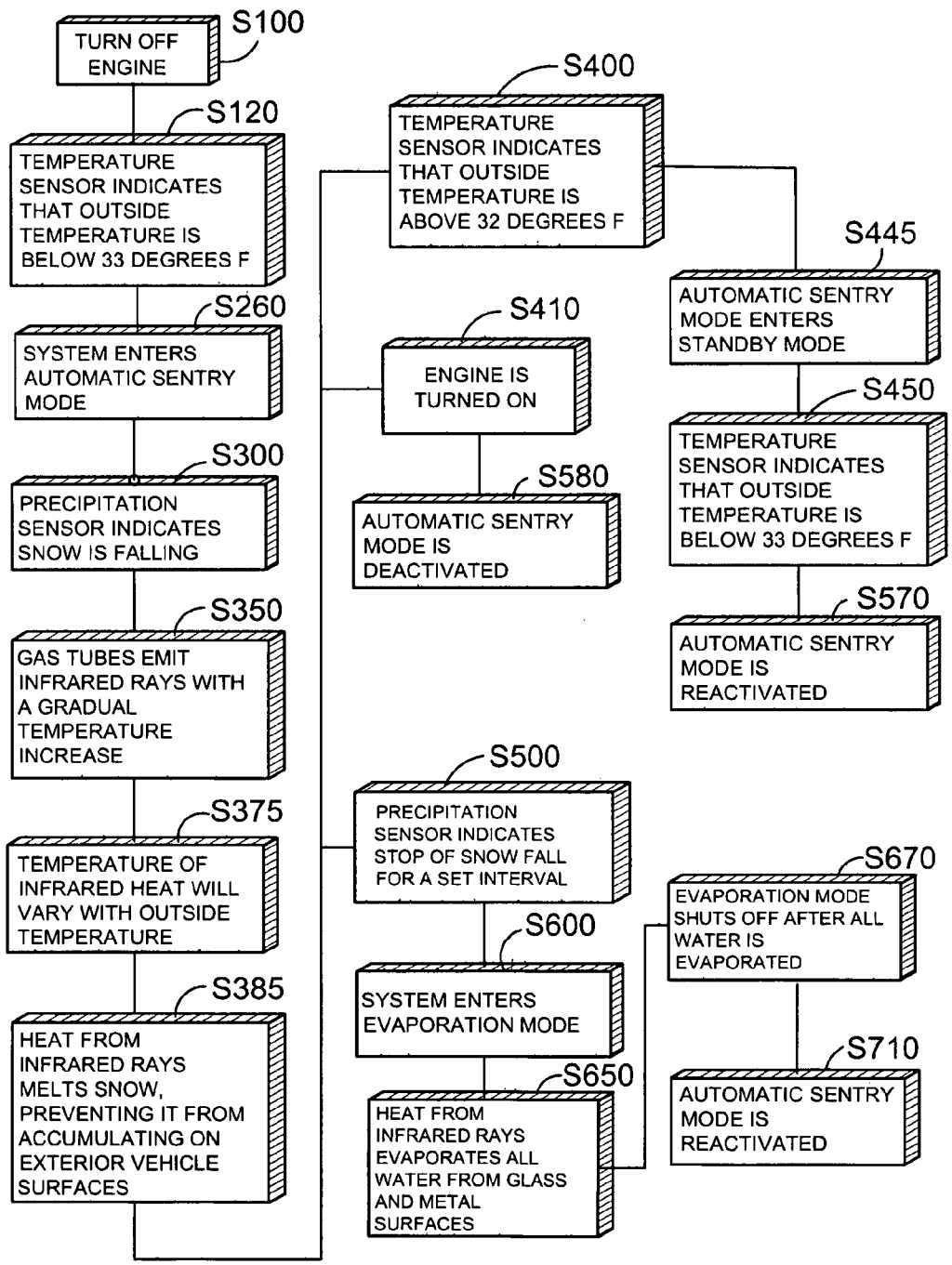
FIG. 9 is a block diagram of the automatic sentry mode of the present invention.

Referring to FIG. 9, shown is a block diagram of the automatic sentry mode of the present invention. In step S100, the engine is turned off initiating engagement of the temperature sensor, which when the temperature sensor indicates that the outside temperature is below 33° F. in step S120, the system enters automatic sentry mode in step S260.

In step S300 when the precipitation sensor detects snow falling, gas tubes emit infrared rays with a gradual temperature increase in step S350 with the temperature of the infrared heat varying with outside temperature in step S375. Accordingly, heat from the infrared rays melts snow, preventing it from accumulating on exterior vehicle surfaces in step S385.

When the temperature sensor indicates that outside temperature is above 32° F. in step S400, automatic sentry mode enters standby mode in step S445 until in step S450 when the temperature sensor indicates that outside temperature goes below 33° F., whereupon, automatic sentry mode is reactivated in step S570.

In step S500, the precipitation sensor indicates the stop of snowfall for a set interval. The system enters evaporation mode in step S600 with heat from infrared rays that evaporate all water from glass and metal surfaces in step S650. Evaporation mode shuts off after all water is evaporated in step S670, with the system reverting to automatic sentry mode in step S710.

Once the engine is turned on in step S410, automatic sentry mode is deactivated in step S580.

Figure 10:
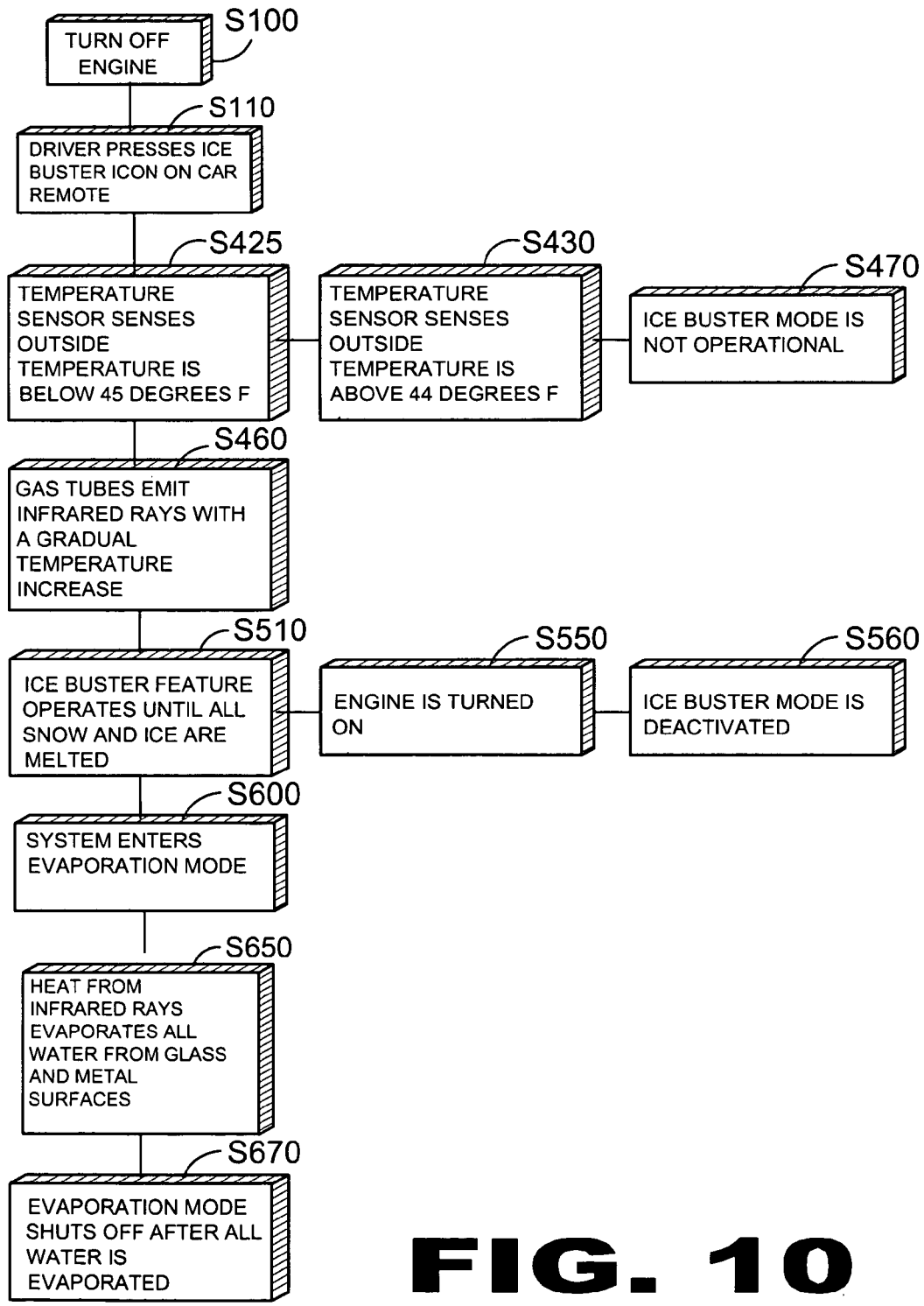
FIG. 10 is a block diagram of the ice buster mode of the present invention.

Referring to FIG. 10, shown is a block diagram of the ice buster mode of the present invention. As shown in step S100, the engine is turned off. The driver presses the ice buster icon on the car remote in step S110.

When the temperature sensor indicates that the outside temperature is below 45° F. in step S425, gas tubes emit infrared rays with a gradual temperature increase in step S460 with the ice buster feature operating until all snow and ice are melted in step S510. The system enters evaporation mode in step S600. Whereupon heat from infrared rays evaporates all water from glass and metal surfaces in step S650. Evaporation mode shuts off after all water is evaporated in step S670.

When the temperature sensor indicates that outside temperature is above 44° F. in step S430, ice buster mode is not operational in step S470.

Once the engine is turned on in step S550, the ice buster mode is deactivated in step S560.

Figure 11A:
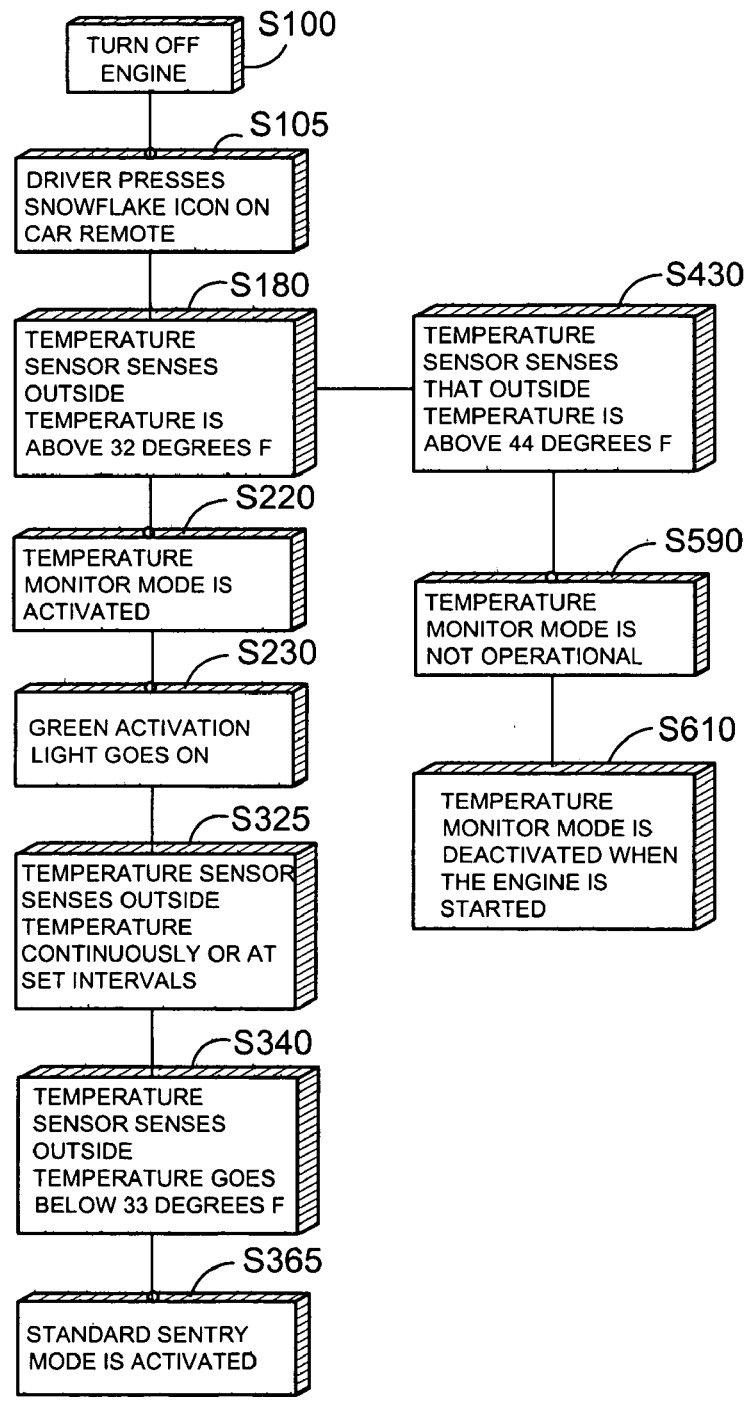
FIG. 11a is a block diagram of the temperature monitor mode with the standard sentry mode of the present invention.

Referring to FIG. 11a, shown is a block diagram of the temperature monitor mode with the standard sentry mode of the present invention. As shown in step S100, the engine is turned off. The driver presses the snowflake icon on the car remote in step S105.

When the temperature sensor senses that the outside temperature is above 32° F. as stated in step S180, temperature monitor mode is activated in step S220 and a green activation light goes on in step S230 with the temperature sensor sensing outside temperature continuously or at set intervals in step S325.

If the temperature sensor senses that the outside temperature goes below 33° F. as stated in step S340, standard sentry mode is activated in step S365

Thereafter, when the temperature sensor senses that the outside temperature is above 44° F. as stated in step S430, temperature monitor mode is not operational in step S590 and in step S610 temperature monitor mode is deactivated when the engine is started.

Figure 11B:
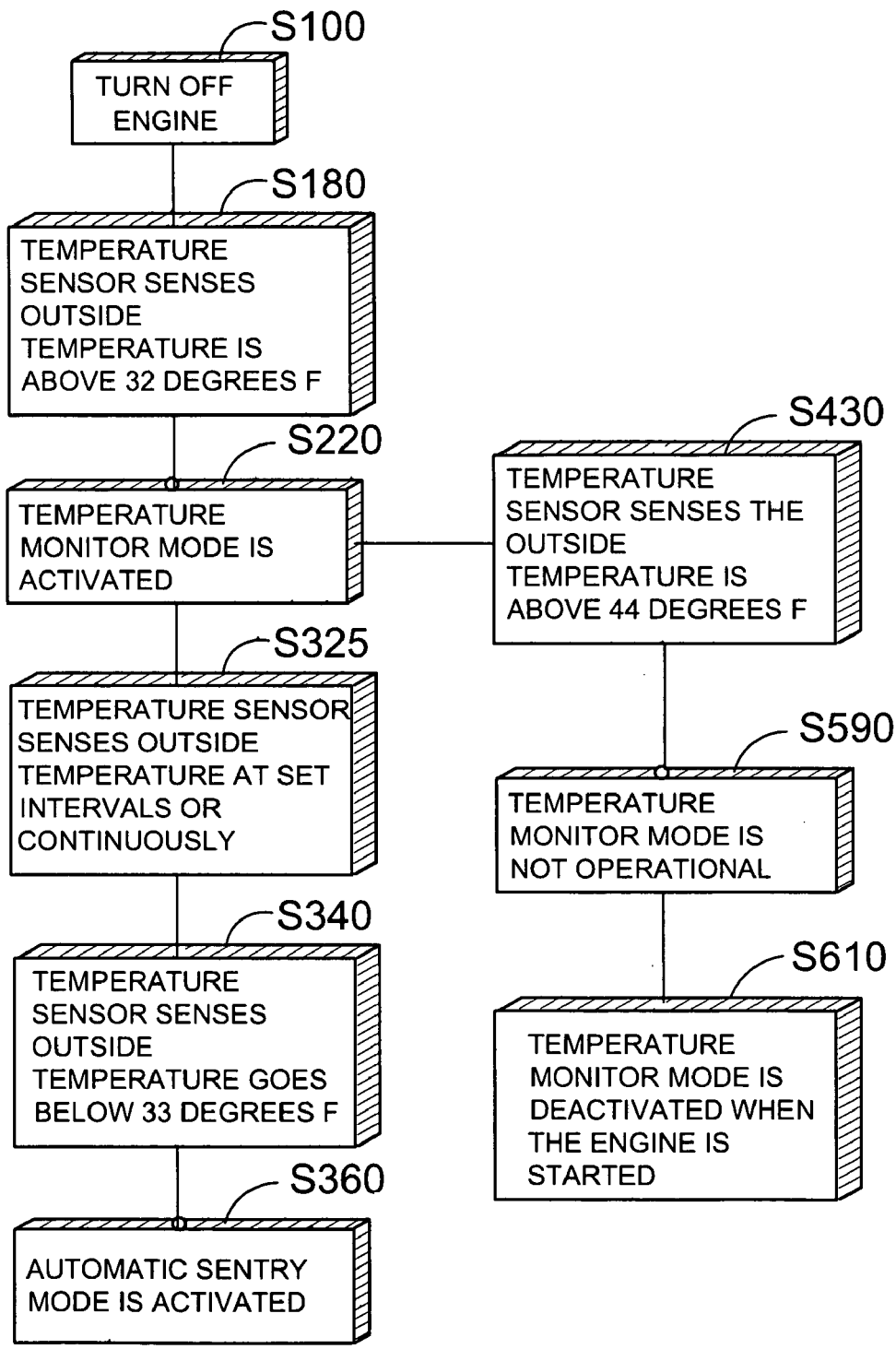
FIG. 11b is a block diagram of the temperature monitor mode with the automatic sentry mode of the present invention.

Referring to FIG. 11b, shown is a block diagram of the temperature monitor mode with the automatic sentry mode of the present invention. As shown in step S100, the engine is turned off. Thereafter, when the temperature sensor senses that the outside temperature is above 32° F. as stated in step S180, temperature monitor mode is activated. When the temperature sensor senses that the outside temperature is above 44° F. as stated in step S430, temperature monitor mode is not operational in step S590 and in step S610 temperature monitor mode is deactivated when the engine is started. During temperature monitor mode, the temperature sensor senses outside temperature at set intervals or continuously in step S325.

If the temperature sensor senses that the outside temperature goes below 33° F. as stated in step S340, automatic sentry mode is activated in step S360.

Figure 12A:
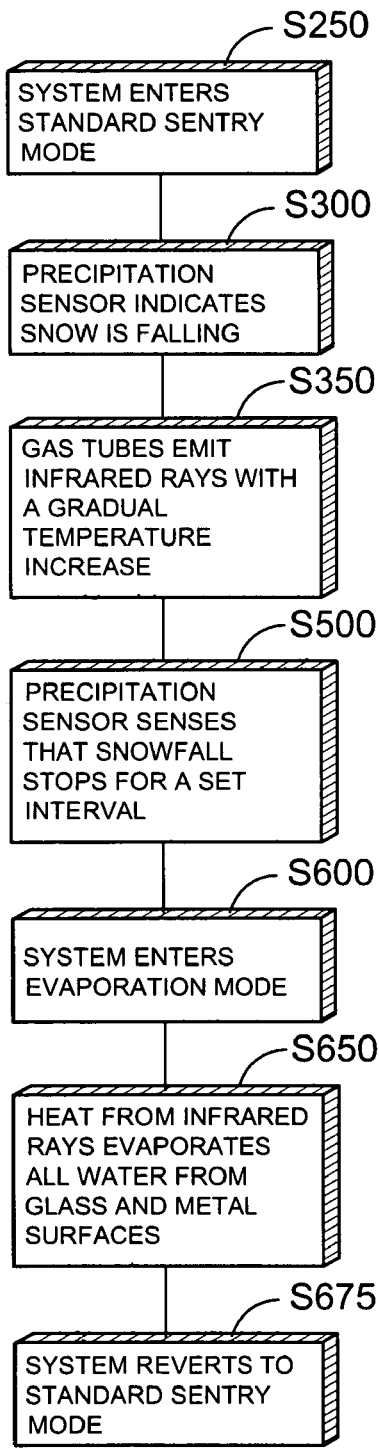
FIG. 12a is a block diagram of the evaporation mode with the standard sentry mode of the present invention.

Referring to FIG. 12a, shown is a block diagram of the evaporation mode with the standard sentry mode of the present invention. As shown in step S250, the system enters standard sentry mode. Upon the precipitation sensor indicating snow is falling in step S300, gas tubes emit infrared rays with a gradual temperature increase in step S350. When in step S500 the precipitation sensor senses that snowfall stops for a set interval, the system enters evaporation mode in step S600. Whereupon heat from infrared rays evaporates all water from glass and metal surfaces in step S650 with the system reverting to standard sentry mode in step S675.

Figure 12B:
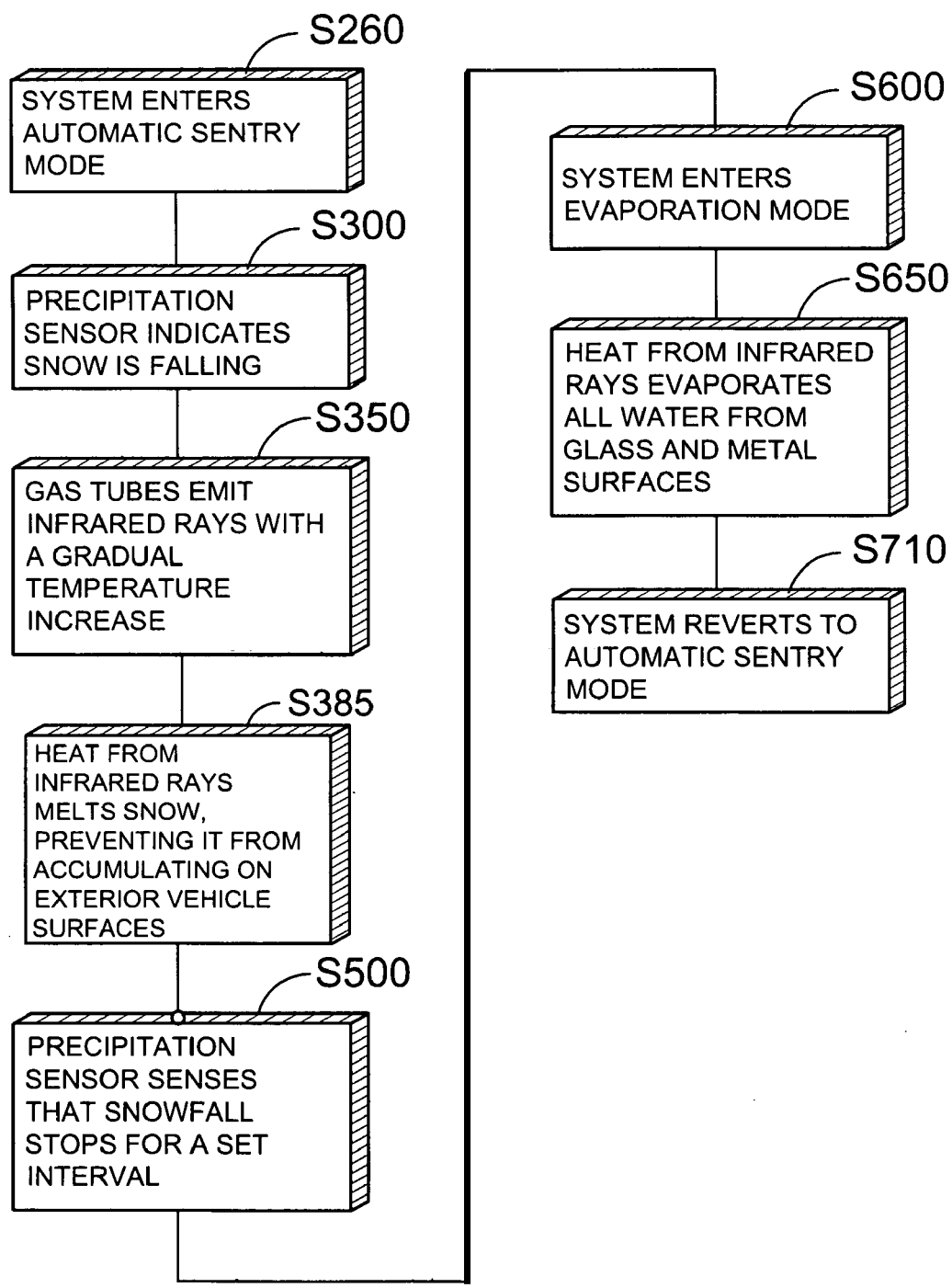
FIG. 12b is a block diagram of the evaporation mode with the automatic sentry mode of the present invention.

Referring to FIG. 12b, shown is a block diagram of the evaporation mode with the automatic sentry mode of the present invention. As shown in step S260, the system enters automatic sentry mode. Upon the precipitation sensor indicating snow is falling in step S300, gas tubes emit infrared rays with a gradual temperature increase in step S350. Accordingly, heat from the infrared rays melts snow, preventing it from accumulating on exterior vehicle surfaces in step S385. When in step S500 the precipitation sensor senses that snowfall stops for a set interval, the system enters evaporation mode in step S600. Whereupon heat from infrared rays evaporates all water from glass and metal surfaces in step S650 with the system reverting to automatic sentry mode in step S710.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An automotive ice and snow eliminator comprising:
   a) at least one temperature sensor;
   b) at least one precipitation sensor;
   c) a plurality of gas tubes exteriorly disposed on said vehicle for emitting infrared heat in the proximal vicinity thereof;
   d) a processor in communication with said temperature sensor, said precipitation sensor and said gas tubes; and
   e) user controls for enabling and disabling said ice and snow eliminator.

2. The automotive ice and snow eliminator as recited in claim 1, wherein said user controls include:
   a) a lock button;
   b) an unlock button;
   c) an ice buster button;
   d) a snowflake icon button; and
   e) an ignition start button.

3. The automotive ice and snow eliminator as recited in claim 2, wherein said user controls are disposed on a wireless remote unit.

4. The automotive ice and snow eliminator as recited in claim 3, wherein a green activation light and white activation light are disposed on the dashboard of the vehicle.

5. The automotive ice and snow eliminator as recited in claim 1, wherein said gas tubes are disposed proximal to the front windshield, the rear windshield, the side windows, side view mirrors, hood, roof and trunk.

6. The automotive ice and snow eliminator as recited in claim 5, having a standard sentry mode wherein the activation process involves:
   a) the user turning off the engine;
   b) the user pressing said snowflake icon button on said remote unit;
   c) said temperature sensor indicating that the outside temperature is at or below the freezing level; and
   d) system entering standard sentry mode.

7. The automotive ice and snow eliminator as recited in claim 6, having a standard sentry mode wherein the operational process involves:
   a) said white activation light turning on;
   b) a 72-hour countdown clock starting;
   c) said precipitation sensor indicating that snow is falling;
   d) gas tubes emitting infrared heat with a gradual temperature increase;
   e) said gas tubes turning on and off continuously to save energy;
   f) the temperature of said infrared heat varying accordingly with the outside temperature;
   g) said infrared heat melting snow thereby preventing it from building up on the exterior surface of said vehicle; and
   h) said precipitation sensor indicates stop of snowfall for a predetermined duration.

8. The automotive ice and snow eliminator as recited in claim 7, having a standard sentry mode wherein the evaporation mode and reverting process involves:
   a) system entering evaporation mode;
   b) heat from infrared rays evaporating all water from glass and metal surfaces;
   c) evaporation mode shutting down after all water is evaporated; and
   d) system reverting to standard sentry mode.

9. The automotive ice and snow eliminator as recited in claim 6, having a standard sentry mode wherein the deactivation process involves:
   a) said 72-hour clock expiring; and
   b) deactivating said standard sentry mode.

10. The automotive ice and snow eliminator as recited in claim 6, having a standard sentry mode wherein the temperature sensing and reverting process involves:
    a) temperature sensor indicating that the outside temperature is above freezing;
    b) standard sentry mode entering standby mode;
    c) said temperature sensor indicating that the outside temperature is at or below freezing; and
    d) system reverting to standard sentry mode.

11. The automotive ice and snow eliminator as recited in claim 6, having a standard sentry mode wherein the deactivation process involves:
    a) engine being turned on; and
    b) deactivating standard sentry mode.

12. The automotive ice and snow eliminator as recited in claim 5, having an automatic sentry mode wherein the activation process involves:
    a) the user turning off the engine;
    b) said temperature sensor indicating that the outside temperature is at or below the freezing level; and
    c) system entering automatic sentry mode.

13. The automotive ice and snow eliminator as recited in claim 5, having an automatic sentry mode wherein the operational process involves:
    a) precipitation sensor indicating that snow is falling;
    b) said gas tubes emitting infrared heat with a gradual temperature increase;
    c) temperature of said infrared heat varying accordingly with the outside temperature; and
    d) infrared heat melting the snow thus preventing it from accumulating on the exterior surface of said vehicle.

14. The automotive ice and snow eliminator as recited in claim 12, having an automatic sentry mode wherein the temperature sensing and reverting process involves:
    a) said temperature sensor indicating that the outside temperature is above freezing;
    b) automatic sentry mode entering standby mode;
    c) temperature sensor indicating that the outside temperature is at of below freezing; and
    d) system reverts to automatic sentry mode.

15. The automotive ice and snow eliminator as recited in claim 12, having an automatic sentry mode wherein the deactivation process involves:
   a) turning on the engine; and
   b) deactivating automatic sentry mode.

16. The automotive ice and snow eliminator as recited in claim 12, having an automatic sentry mode wherein the evaporation and reactivation process involves:
   a) said precipitation sensor indicating stop of snowfall for a predetermined duration;
   b) system entering evaporation mode;
   c) infrared heat evaporating all water from glass and metal surfaces;
   d) evaporation mode shutting off after all water is evaporated; and
   e) reactivating automatic sentry mode.

17. The automotive ice and snow eliminator as recited in claim 5, having an ice buster mode wherein enabling and operation thereof involves;
   a) turning the engine off;
   b) pressing said ice buster icon on said remote unit;
   c) said temperature sensor indicating that outside temperature is below 45 degrees Fahrenheit;
   d) said gas tubes emitting infrared heat with a gradual temperature increase;
   e) ice buster feature operating until all snow and ice is melted;
   f) system entering evaporation mode;
   g) said infrared heat evaporating all water from glass and metal surfaces; and
   h) evaporation mode shutting off after all water is evaporated.

18. The automotive ice and snow eliminator as recited in claim 17, having an ice buster mode that is not operational as long as said temperature sensors indicate that the outside temperature is above 44 degrees Fahrenheit.

19. The automotive ice and snow eliminator as recited in claim 17, having an ice buster mode that is deactivated once the vehicle's engine is turned on.

20. The automotive ice and snow eliminator as recited in claim 5, having a temperature monitor mode with standard sentry mode wherein the activation process involves:
   a) turning the engine off;
   b) user pressing said snowflake icon on said remote unit;
   c) temperature sensor indicating that the outside temperature is above 32 degrees Fahrenheit; and
   d) temperature monitor mode being activated.

21. The automotive ice and snow eliminator as recited in claim 5, having a temperature monitor mode with standard sentry mode wherein the operational process involves:
   a) green activation light being turned on;
   b) temperature sensor monitoring outside temperature continuously or at set intervals;
   c) temperature sensor indicating that outside temperature is below 33 degrees Fahrenheit; and
   d) standard sentry mode being activated.

22. The automotive ice and snow eliminator as recited in claim 20, wherein said temperature monitor mode with standard sentry mode is non-operational when said temperature sensor indicates that the outside temperature is above 44 degrees Fahrenheit thereby rendering temperature monitor mode non-operational.

23. The automotive ice and snow eliminator as recited in claim 20, having said temperature monitor mode with standard sentry mode wherein the deactivation process involves:
   a) turning on the engine; and
   b) deactivating temperature monitor mode with standard sentry mode.

24. The automotive ice and snow eliminator as recited in claim 5, having a temperature monitor mode with automatic sentry mode wherein the activation process thereof involves:
   a) turning the engine off;
   b) temperature sensor indicating that the outside temperature is above 32 degrees Fahrenheit; and
   c) temperature monitor mode being activated.

25. The automotive ice and snow eliminator as recited in claim 5, having a temperature monitor mode with automatic sentry mode wherein the operational process involves:
   a) temperature sensor monitoring outside temperature continuously or at set intervals;
   b) temperature sensor indicating that outside temperature is below 33 degrees Fahrenheit; and
   c) automatic sentry mode being activated.

26. The automotive ice and snow eliminator as recited in claim 24, wherein said temperature monitor mode with automatic sentry mode is non-operational when aid temperature sensor indicates that the outside temperature is above 44 degrees Fahrenheit thereby rendering temperature monitor mode non-operational.

27. The automotive ice and snow eliminator as recited in claim 24, having said temperature monitor mode with automatic sentry mode wherein the deactivation process involves:
   a) turning on the engine; and
   b) deactivating temperature monitor mode with automatic sentry mode.

28. The automotive ice and snow eliminator as recited in claim 5, having an evaporation mode with standard sentry mode wherein operation thereof involves:
   a) system entering standard sentry mode;
   b) precipitation sensor indicating that snow is falling;
   c) gas tubes emitting infrared heat with a gradual temperature increase;
   d) precipitation sensor indicating that snowfall stops for a set interval;
   e) system entering evaporation mode;
   f) infrared heat evaporating all water from glass and metal surfaces; and
   g) system reverting to standard sentry mode.

29. The automotive ice and snow eliminator as recited in claim 5, having an evaporation mode with automatic sentry mode wherein operation thereof involves:
   a) system entering automatic sentry mode;
   b) precipitation sensor indicating that snow is falling;
   c) gas tubes emitting infrared heat to melt snow thereby prohibiting it from accumulating on the vehicle surface;
   d) precipitation sensor indicating that snowfall stops for a set interval;
   e) system entering evaporation mode;
   f) infrared heat evaporating all water from glass and metal surfaces; and
   g) system reverting to automatic sentry mode.

\* \* \* \* \*